US012590689B1

(12) United States Patent
Xiong et al.

(10) Patent No.: US 12,590,689 B1
(45) Date of Patent: Mar. 31, 2026

(54) GLARE-ADJUSTABLE LIGHTING TOOL

(71) Applicant: Hangzhou Lijiacheng Electric Co., Ltd., Hangzhou City (CN)

(72) Inventors: Xianwen Xiong, Hangzhou City (CN); Jianan Tong, Hangzhou City (CN); Luo Zhao, Hangzhou City (CN)

( * ) Notice: Subject to any disclaimer, the term of this patent is extended or adjusted under 35 U.S.C. 154(b) by 0 days.

(21) Appl. No.: 19/372,552

(22) Filed: Oct. 29, 2025

(30) Foreign Application Priority Data

Sep. 24, 2025 (CN) ........................ 202511369383.4

(51) Int. Cl.
*F21V 1/12* (2006.01)
*F21S 8/02* (2006.01)
*F21V 17/02* (2006.01)
*F21V 21/04* (2006.01)

(52) U.S. Cl.
CPC ................ *F21V 1/12* (2013.01); *F21S 8/026* (2013.01); *F21V 17/02* (2013.01); *F21V 21/047* (2013.01)

(58) Field of Classification Search
CPC .......... F21S 8/026; F21V 14/02; F21V 17/02; F21V 21/042; F21V 21/046; F21V 21/047
See application file for complete search history.

(56) References Cited

U.S. PATENT DOCUMENTS

| | | | | |
|---|---|---|---|---|
| 10,234,091 B1 * | 3/2019 | Chaimberg | ............. | F21S 8/043 |
| 2019/0063736 A1 * | 2/2019 | Zeng | ....................... | F21V 21/30 |
| 2021/0102690 A1 * | 4/2021 | Zeng | ....................... | F21S 8/026 |
| 2021/0341133 A1 * | 11/2021 | Xue | ........................ | F21V 17/02 |

FOREIGN PATENT DOCUMENTS

| | | | | |
|---|---|---|---|---|
| DE | 102021116519 A1 * | 12/2022 | .............. | F21V 17/02 |
| KR | 101017631 B1 * | 2/2011 | ................ | F21S 8/02 |

* cited by examiner

*Primary Examiner* — Alexander K Garlen
(74) *Attorney, Agent, or Firm* — Nitin Kaushik

(57) ABSTRACT

The present application relates to a lighting tool, comprising a light source, a light-transmitting member, a mounting housing, and an adjusting member; the mounting housing includes an anti-glare portion, and the anti-glare portion surrounds the periphery of the light-transmitting member; the adjusting member is connected to the mounting housing and the light-transmitting member, respectively, and adjusts the glare value of the light source by changing the position of the light-transmitting member relative to the anti-glare portion. The present application has the effect of being able to adjust the glare value of lighting tools according to application scenarios, which can meet requirements for light intensity and anti-glare.

15 Claims, 15 Drawing Sheets

GLARE-ADJUSTABLE LIGHTING TOOL

CROSS-REFERENCE TO RELATED APPLICATIONS

Technical Field

The present application relates to the technical field of lighting tools, and in particular to a lighting tool.

Background

Lighting tools are commonly used lighting devices indoors and outdoors. They are the core equipment for realizing the construction of spatial light environment in the modern lighting field. Their optical performance directly affects users' visual comfort and use experience. In the prior art, some lighting tools are often designed with focus on improving light intensity and coverage, but strong direct or reflected light can easily form dazzling glare, causing visual discomfort. Some other lighting tools focus on alleviating glare to improve visual comfort, but when applied to scenarios requiring strong light illumination, the light intensity and luminous angle are not sufficient.

SUMMARY

The present application provides a lighting tool. Of which, the glare value of a light source is adjustable according to application scenarios to meet the requirements for lighting intensity or visual comfort, and the size is adjustable according to mounting scenarios to meet different mounting requirements.

The present application provides a lighting tool, with the following technical solution adopted:

A lighting tool, including a light source, a light-transmitting member, a mounting housing, and an adjusting member; and the mounting housing includes an anti-glare portion, and the anti-glare portion surrounds the periphery of the light-transmitting member; the adjusting member is connected to the mounting housing and the light-transmitting member, respectively, and adjusts the glare value of the light source by changing the position of the light-transmitting member relative to the anti-glare portion.

By adopting the above technical solution, the position of the light-transmitting member relative to the anti-glare portion is changed to change the contact area and contact angle between the light and the anti-glare portion, so that the glare value of the lighting tool can be adjusted, depending on application scenarios. In this way, both the intensity requirements and the anti-glare requirements are met.

Preferably, the light-transmitting member includes a light-transmitting panel, and the anti-glare portion includes an anti-glare wall plate or an anti-glare side plate; the anti-glare wall plate is tilted relative to the light-transmitting panel, and the anti-glare side plate is perpendicular to the light-transmitting panel; and the light-transmitting panel is configured to block all or part of the inner side surface of the anti-glare wall plate or the anti-glare side plate.

By adopting the above technical solution, the light-transmitting panel and the anti-glare wall plate are tilted or the light-transmitting panel is vertically arranged with the anti-glare side plate, and part or all of the inner side surface of the anti-glare wall plate or the anti-glare side plate is covered to enable or disable an anti-glare effect.

Preferably, the anti-glare portion includes a plurality of anti-glare steps, the plurality of anti-glare steps are connected to the inner side surface of the anti-glare wall plate and arranged step by step; the light-transmitting panel blocks some or all of the anti-glare steps; and different numbers of the anti-glare steps exposed will result in different glare values of the light source.

By adopting the above technical solution, a plurality of anti-glare steps are arranged on an inner side of the inclined anti-glare wall plate to increase the area in contact with light and improve the anti-glare effect; and by adjusting the number of exposed anti-glare steps, different glare values can be achieved to obtain different anti-glare effects to meet more lighting needs.

Preferably, the adjusting member includes an adjusting seat, the adjusting seat includes a top plate and a side plate, the top plate is parallel to the light-transmitting panel, one end of the side plate is connected to the top plate, and the other end is connected to the light-transmitting panel, the side plate surrounds the periphery of the light-transmitting panel, the light source is located between the top plate and the light-transmitting panel, and the mounting housing is movably connected to the side plate so that the top plate is away from or close to the mounting housing.

By adopting the above technical solution, the side plate is set to be movable relative to the mounting housing, so that the top plate is away from or close to the mounting housing, and the lamp body is retractable and easy to adjust.

Preferably, the side plate is provided with a plurality of sliding grooves along its circumference, and the opening of the sliding groove faces the mounting housing; the mounting housing includes a plurality of sliding blocks, and the plurality of sliding blocks correspond to the plurality of sliding grooves one by one; the sliding blocks and the sliding grooves are configured to guide and limit the mounting housing and the side plate when they move relative to each other.

By adopting the above technical solution, guiding is performed during the movement of the side plate to avoid offset and jamming, and limiting is performed at the same time to prevent the side plate from moving too much and detaching from the mounting housing.

Preferably, at least one stop bar is provided in the sliding groove, the at least one stop bar is close to the top of the sliding groove and parallel to the circumference of the top plate, and the sliding block is located between the stop bar and the top of the sliding groove to maintain the position of the light-transmitting panel.

By adopting the above technical solution, the lighting tool can be kept in a retracted state, which is conducive to packaging and shipment, improves the loading rate, and saves transportation costs.

Preferably, a plurality of stop bars are provided in the sliding groove, the plurality of stop bars are arranged at intervals along the moving direction of the side plate, a limiting portion is formed between two adjacent stop bars to limit the sliding block, and the position of the light-transmitting panel relative to the anti-glare portion is changed by making the sliding block enter different limiting portions.

By adopting the above technical solution, the light-transmitting panel can remain unchanged at each position, so that the anti-glare effect is stable.

Preferably, two stop bars are provided in the sliding groove, namely a first stop bar near the top of the sliding groove and a second stop bar near the bottom of the sliding groove; the sliding block is located between the first stop bar and the top of the sliding groove, the inner side surface of the anti-glare wall plate or the anti-glare side plate is completely blocked, the sliding block is located between the second stop bar and the bottom of the sliding groove, and the inner side surface of the anti-glare wall plate or the anti-glare side plate is exposed.

By adopting the above technical solution, the lighting tool can be kept in a retracted state or an unfolded state.

Preferably, the adjusting member includes a fixing ring, a positioning boss is provided at one end of the side plate away from the top plate, the fixing ring and the positioning boss surround the periphery of the light-transmitting panel, the fixing ring is engaged with the side plate and is located below the positioning boss, and the periphery of the light-transmitting panel is located between the positioning boss and the fixing ring.

By adopting the above technical solution, the connection between the light-transmitting panel and the adjusting member is realized, and the fixing ring is located on the periphery of the light-transmitting panel, which will not affect the light-transmitting effect of the light-transmitting panel.

Preferably, two elastic buckles are provided, the elastic buckle includes an elastic member and a bracket, the mounting housing includes two plug-ins, the plug-in is provided with a first slot, the bracket is adapted to be plugged into the first slot, the elastic member is buckled in the first slot by means of the bracket, and the two elastic buckles are symmetrically arranged.

By adopting the above technical solution, the lighting tool can be quickly installed in the space environment and prevented from being separated.

In a second aspect, the present application further provides a lighting tool, including: a light source, a light-transmitting member, a mounting housing, and an adjusting member; the light source and the light-transmitting member are connected to the adjusting member, the adjusting member is connected to the mounting housing in a sleeved manner, the adjusting member can move relative to the mounting housing along an axial direction of the mounting housing, and the thickness of the lighting tool can be changed and maintained when the adjusting member moves relative to the mounting housing, so that the lighting tool can be adapted to be mounted in different positions.

By adopting the above technical solution, the adjusting member can be moved to the corresponding position and remain stationary, the thickness dimension of the lighting tool can be changed, and the lighting tool can be compressed in size at a restricted mounting position to complete the mounting.

Preferably, the mounting housing is connected to a ceiling through the elastic buckle, and a thickness of the ceiling is between 0.3 in and 1.2 in.

By adopting the above technical solution, the mounting housing is connected to the ceiling through an elastic buckle to prevent the lighting tool from falling off, and the thickness of the lighting tool can be extended to allow the lighting tool to be connected to a ceiling with a thickness of 0.3 in ~1.2 in.

The embodiment of the present application provides a lighting tool, which changes the contact area or contact angle between the light and the anti-glare portion, so that glare values can be adjusted according to the spatial scenarios of the application, avoiding insufficient lighting intensity caused by too soft light or visual discomfort caused by excessive strong light. The lighting tool provided in the embodiment of the present application can be adapted to be installed in different mounting positions or scenes by changing the overall volume of the lighting tool through an adjusting member, and is particularly suitable for being installed at a position with a beam above the ceiling.

Figure 1:
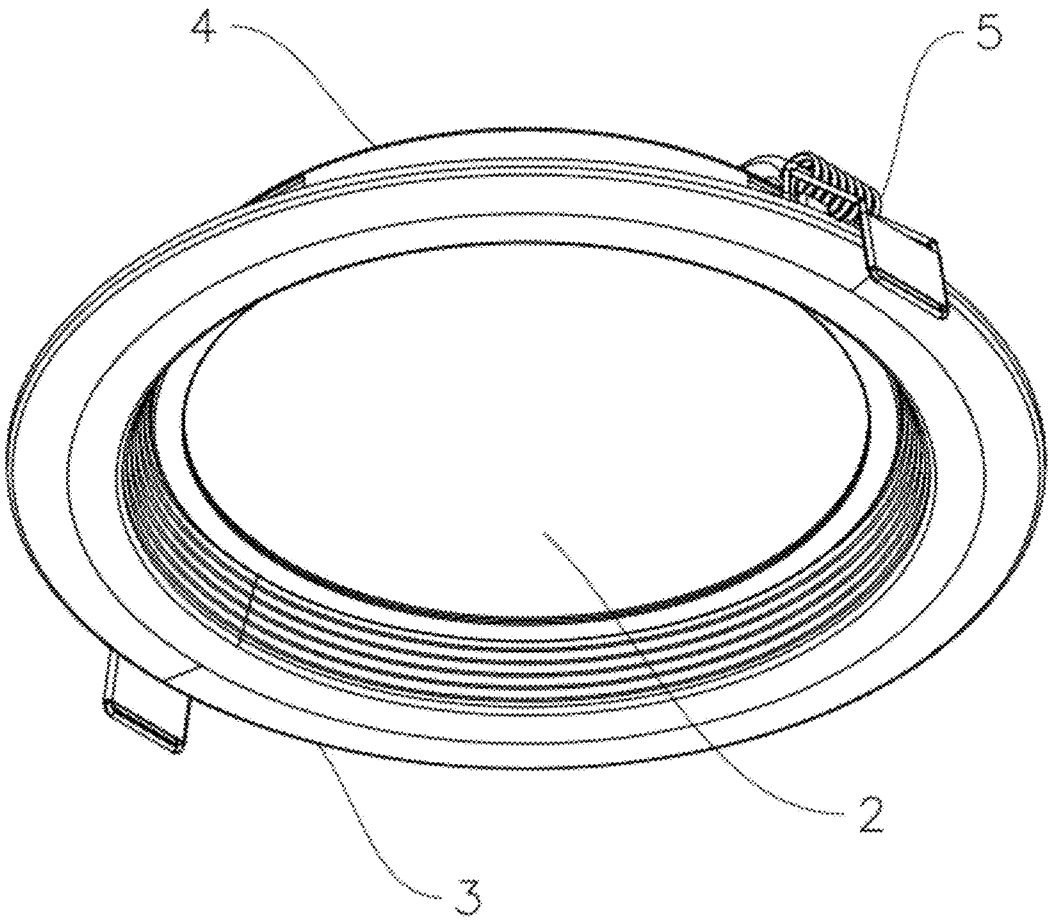
FIG. 1 is a three-dimensional diagram of a lighting tool provided in Embodiment 1 of the present application.

Reference numerals: 1. light source; 11. lamp board; 111. lamp bead; 12. power cord; 2. light-transmitting member; 21. light-transmitting panel; 22. lampshade; 3. mounting housing; 31. mounting panel; 32. anti-glare portion; 321. anti-glare wall plate; 322. anti-glare step; 323. anti-glare side plate; 33. annular top edge; 331. sliding block; 34. plug-in; 341. first slot; 4. adjusting member; 41. adjusting seat; 411. top plate; 412. side plate; 413. positioning boss; 414. sliding groove; 415. stop bar; 4151. first stop bar; 4152. second stop bar; 416. second clamping portion; 417. connector; 42. fixing ring; 421. fixing gasket; 422. fixing edge; 423. first clamping portion; 431. pull ring; 432. receiving groove; 433. rotating shaft; 434. elastic clip; 5, elastic buckle; 51. bracket; 511. buckle portion; 512, pressing plate; 513. second slot; 52. elastic member; 521. U-shaped connecting rod; 61. adjusting screw; 62. fixing seat; and 63. nut.

DETAILED DESCRIPTION OF THE EMBODIMENTS

To more clearly understand the purpose, technical solution, and advantages of the present application, the present application is described and explained in conjunction with the accompanying drawings and embodiments. However, it should be understood by those of ordinary skill in the art that the present application can be implemented without these details. In some cases, in order to avoid unnecessary descriptions that obscure various aspects of the present application, well-known methods, processes, systems, components and/or circuits that have been described at a high level will not be repeated. For those of ordinary skill in the art, it is obvious that various changes can be made to the embodiments disclosed in the present application, and the general principles defined in the present application can be applied to other embodiments and application scenarios without departing from the principles and scope of the present application. Therefore, the present application is not limited to the embodiment shown, but conforms to the broadest scope consistent with the scope of protection claimed in the present application.

It should be noted here that the description of these embodiments is used to help understand the present application, but does not constitute a limitation of the present application. In addition, the technical features involved in the various embodiments of the present application described below can be combined with each other as long as they do not conflict with each other.

In the description of the present application, “several” means one or more, and “a plurality of” means more than two; “greater than”, “less than”, “exceeding”, and so on are understood as excluding the number itself, and “above”, “below”, “within”, and so on are understood as including the number itself. The terms “first” and “second”, if described, are only for the purpose of distinguishing technical features, and cannot be understood as indicating or implying relative importance, implying the number of indicated technical features or implying the sequential relationship between the indicated technical features.

In the description of the present application, descriptions with reference to the terms “one embodiment”, “some embodiments”, “illustrative embodiment”, “example”, “specific example”, or “some examples” mean that specific features, structures, materials or characteristics described in combination with the embodiment or example are contained in at least one embodiment or example of the present application. In the specification, the schematic expressions of the above terms do not necessarily refer to the same embodiments or examples. Moreover, the specific features, structures, materials, or characteristics described may be combined in any one or more embodiments or examples in a combined manner.

The embodiment of the present application discloses a lighting tool.

Embodiment I

Figure 2:
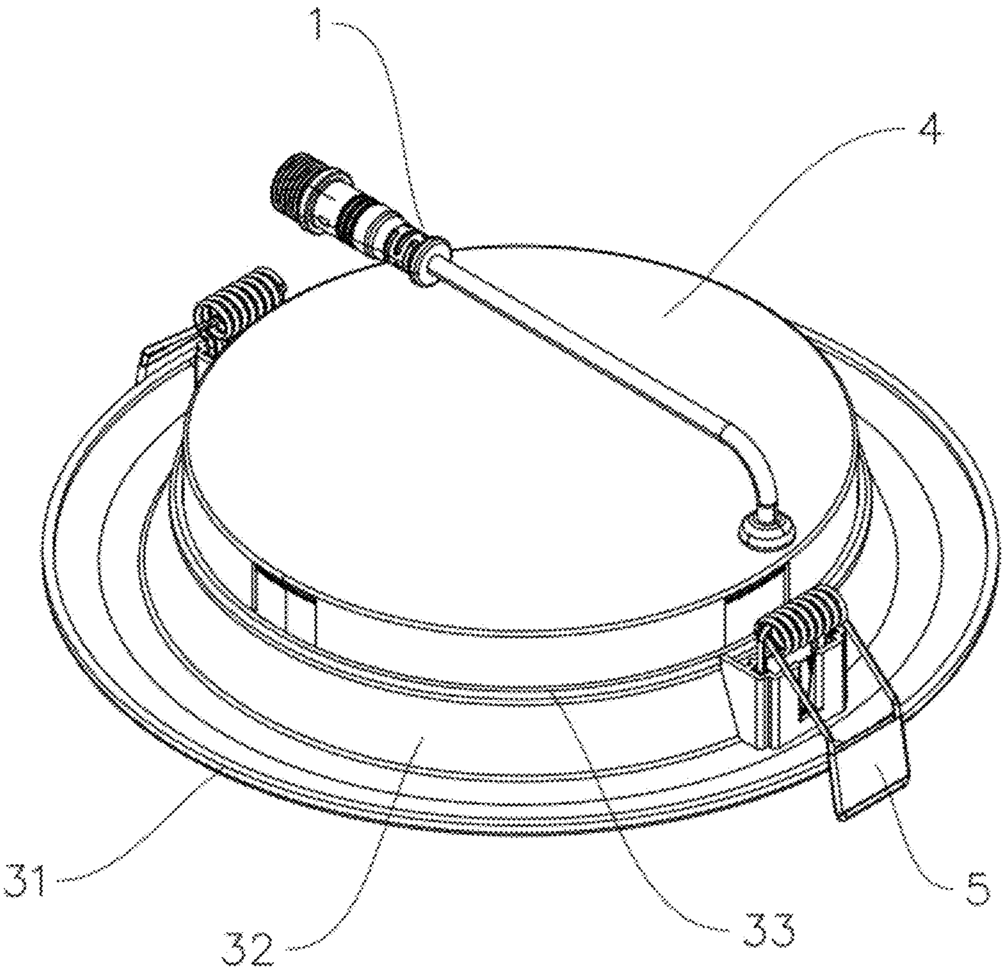
FIG. 2 is another three-dimensional diagram of the lighting tool provided in Embodiment 1 of the present application.
Figure 3:
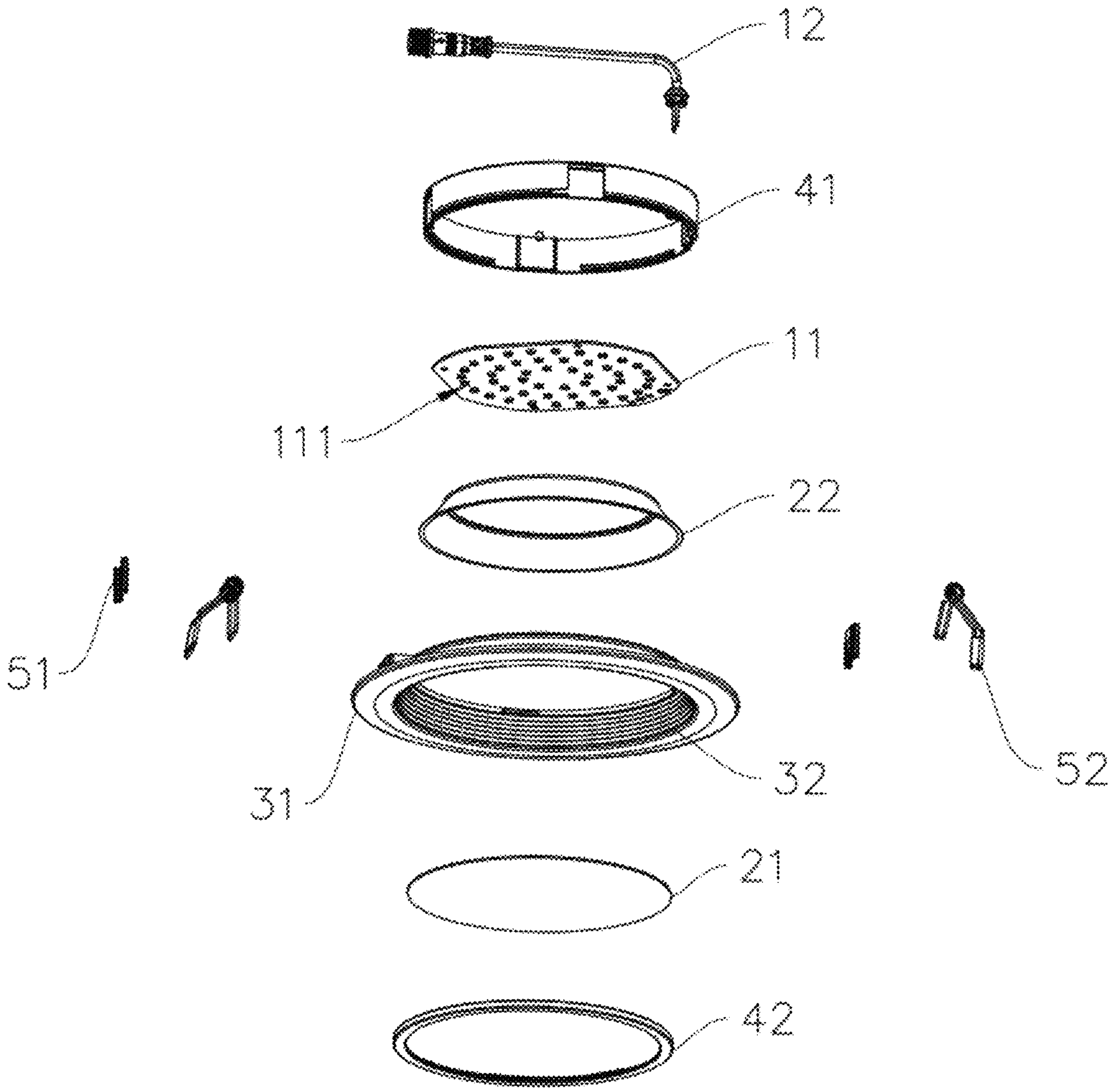
FIG. 3 is an exploded diagram of a lighting tool provided in Embodiment 1 of the present application.

FIGS. 1 to 3 are diagrams of a lighting tool provided in Embodiment 1 of the present application, which includes a light source 1, a light-transmitting member 2, a mounting housing 3, and an adjusting member 4, and among them the mounting housing 3 includes an anti-glare portion 32. The light source 1 disclosed in the present application refers to a light-emitting component that plays a lighting role in a lighting tool, including but not limited to an LED light strip connected to a chip or a motherboard, lamp beads 111, a bulb, and so on, and they are generally connected to an external power supply by means of a power cord 12; the light-transmitting member 2 refers to a component configured to transmit the light of the lamp source 1 to a space environment; the mounting housing 3 is configured to mount and fix the lighting tool to the space environment. For example, in an indoor environment, the mounting housing 3 can be configured to connect to the ceiling; the adjusting member 4 is configured to adjust the glare value of the light source 1, is connected to the mounting housing 3 and the light-transmitting member 2, respectively, and adjusts the glare value of the light source 1 by changing the position of the light-transmitting member 2 relative to the anti-glare portion 32. The glare value refers to the degree to which the light of the light source 1 affects visual comfort when illuminated. The higher the glare value, the stronger the discomfort of human vision. The anti-glare portion 32 refers to a structure for eliminating or alleviating the discomfort caused by light to human vision, which can reduce the brightness concentration of the light source by diffusion, refraction, and so on, making the light softer. The adjusting member 4 is further configured to change the thickness dimension of the lighting tool, and the thickness dimension is the dimension of the lighting tool in the direction of the central axis of the mounting housing 3. The adjusting member 4 is connected to the mounting housing 3 in a sleeved manner and configured to be able to move relative to the mounting housing 3 along the axial direction of the mounting housing 3. During the relative movement, the thickness of the lighting tool can be changed and maintained, so that the lighting tool can be adapted to be mounted in different positions. For example, when there is a beam above the ceiling, the thickness of the lighting tool can be compressed for mounting to avoid interference with the beam.

In the embodiment of the present application, an anti-glare portion 32 is arranged around the periphery of the light-transmitting member 2. The light from the light source 1 passes through the light-transmitting member 2 and then propagates to the peripheral anti-glare portion 32. The glare value is gently reduced by the anti-glare portion 32, thereby eliminating or alleviating the visual discomfort caused by the light. When the position of the light-transmitting member 2 relative to the anti-glare portion 32 is changed by the adjusting member 4, the contact area or contact angle between the light and the anti-glare portion 32 is changed. Therefore, glare values can be adjusted according to the environmental scenarios of the application, avoiding insufficient lighting intensity caused by too soft light or visual discomfort caused by excessive strong light.

The lighting tool disclosed in the present application includes but is not limited to ceiling lamps, chandeliers, spotlights, downlights, floor lamps, wall lamps, and so on used for indoor lighting, and includes but is not limited to outdoor street lamps, underground lamps, garden lamps, and so on. The present embodiment is described below with reference to an indoor ceiling-mounted downlight as an example. For orientation purposes: the side of the downlight facing the ceiling is designated as the upper side, while the side facing the floor is the lower side. The downlight’s external profile is circular in shape.

As shown in FIGS. 1 to 3, the light source 1 includes a lamp board 11 and a power cord 12. A plurality of lamp beads 111 are arranged on the lamp board 11. The power cord 12 is configured to connect to an external power supply to supply power to the lamp beads 111 so that they emit light for lighting. The light-transmitting member 2 includes a circular light-transmitting panel 21 and a trumpet-shaped lampshade 22. The light-transmitting panel 21 is configured to diffuse light into a spatial environment, scatter the light, and make the light uniform and soft. The panel is generally made of transparent or translucent materials; the lampshade 22 is configured to reflect light onto the light-transmitting panel 21 to improve the focusing effect, and is usually made of metal or highly reflective plastic. The mounting housing 3 includes a mounting panel 31, an anti-glare wall plate 321 located above the mounting panel 31, and an annular top edge 33 located above the anti-glare wall plate 321. The bottom of the anti-glare wall plate 321 is connected to the mounting panel 31, and the top of the anti-glare wall plate 321 is connected to the annular top edge 33. The mounting panel 31, the anti-glare wall plate 321, and the annular top edge 33 surround the periphery of the light-transmitting panel 21. The adjusting member 4 includes an adjusting seat 41 and a fixing ring 42, a side of the adjusting seat 41 is movably connected to the annular top edge 33 of the mounting housing 3, the fixing ring 42 is connected to the bottom of the adjusting seat 41, the light-transmitting panel 21 is located between the adjusting seat 41 and the fixing ring 42, and the adjusting seat 41 moves up and down with the side as a movable rail. Two elastic buckles 5 are mounted on the outer sides of the mounting housing 3, and the two elastic buckles 5 are symmetrically arranged for snap-fit connection with the ceiling. In the embodiment of the present application, the adjusting member 4, the mounting housing 3, and the light-transmitting member 2 are coaxially arranged.

Figure 4:
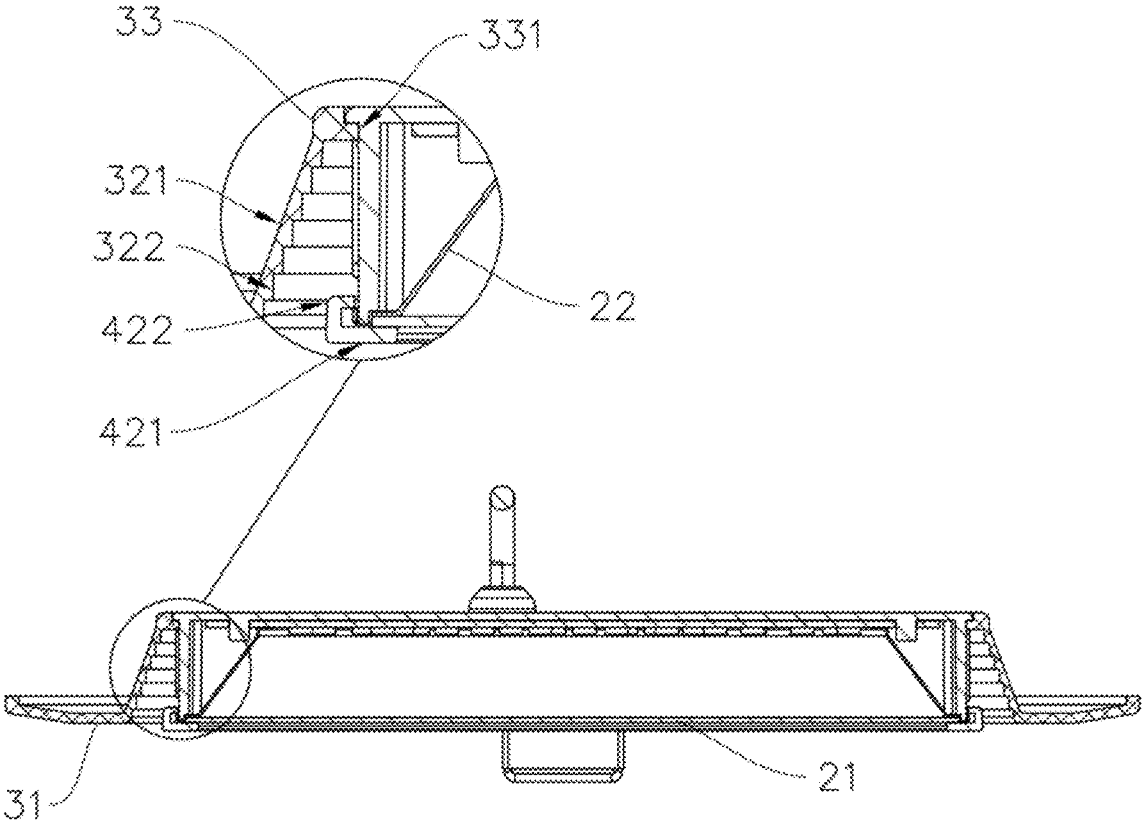
FIG. 4 is a cross-sectional diagram of a light-transmitting panel provided in Embodiment 1 of the present application when it is flush with the mounting panel.
Figure 5:
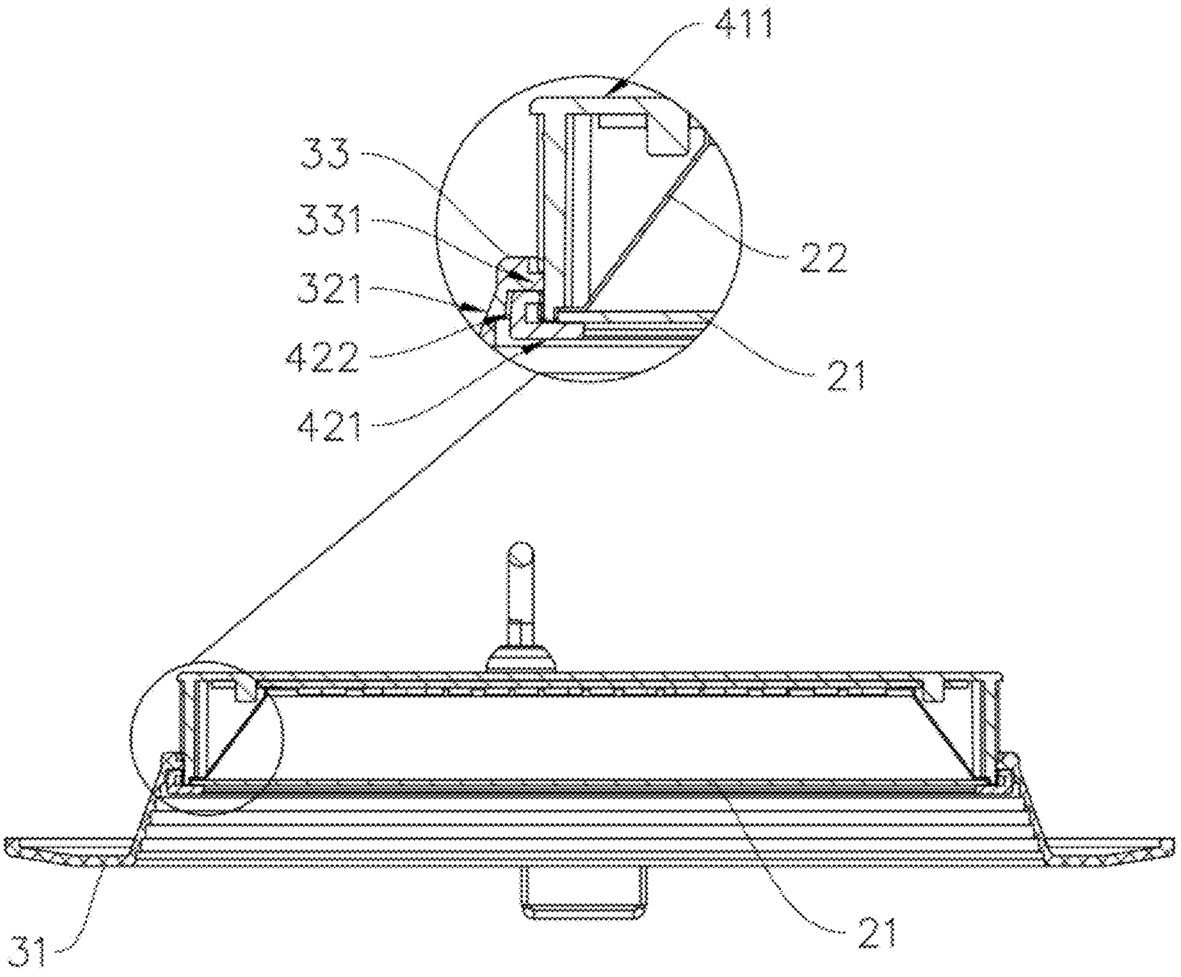
FIG. 5 is a cross-sectional diagram of the light-transmitting panel provided in Embodiment 1 of the present application when the parallel spacing between the light-transmitting panel and the mounting panel is the maximum.
Figure 6:
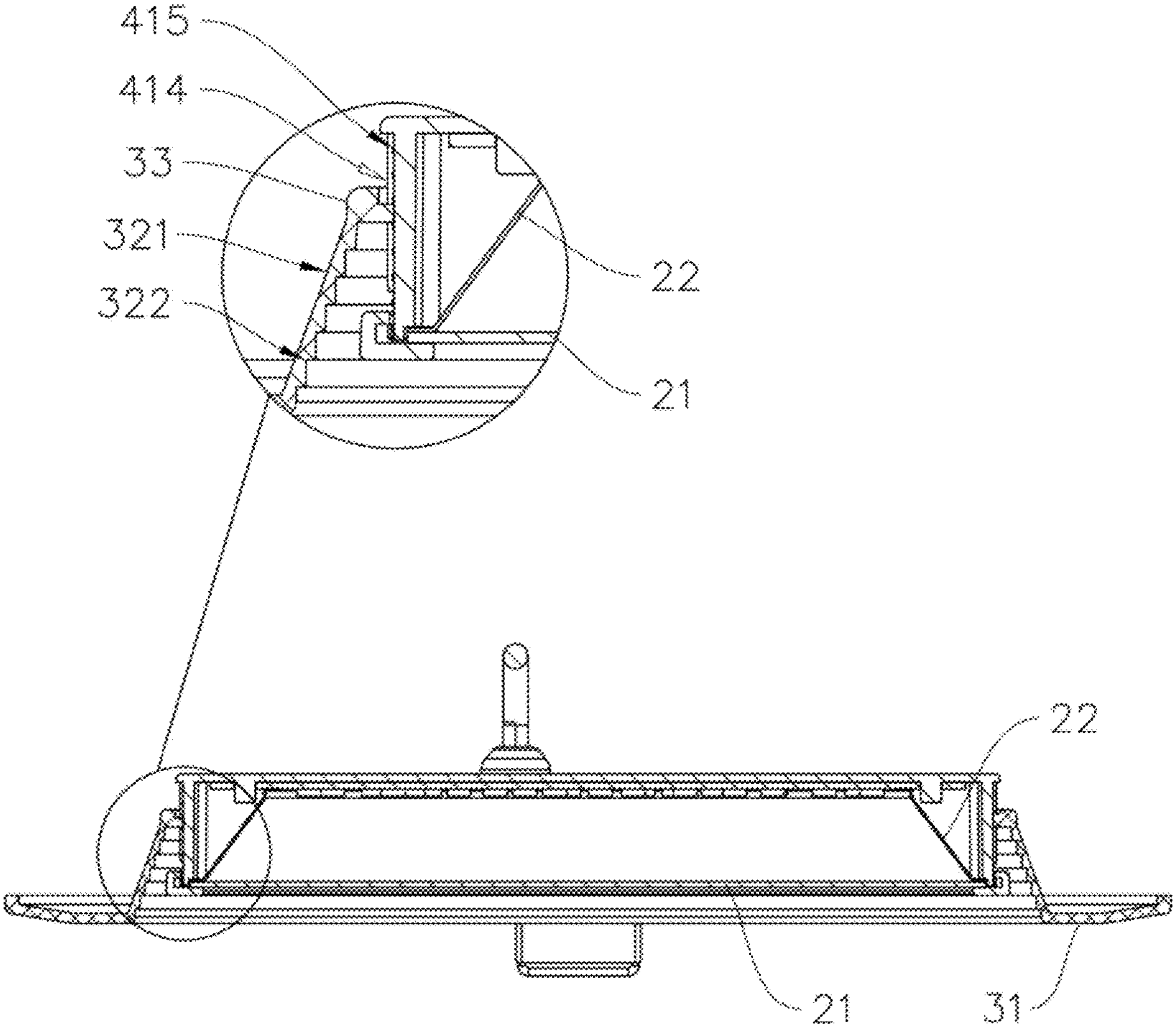
FIG. 6 is a cross-sectional diagram of the light-transmitting panel provided in Embodiment 1 of the present application when it is parallel to the mounting panel but the spacing is not the maximum.

FIGS. 4 to 6 are diagrams of the lighting tool provided in Embodiment 1 of the present application with different anti-glare effects. In Embodiment 1, the light-transmitting panel 21 can be flush with or parallel to the bottom surface of the mounting panel 31, the light source 1 is located above the light-transmitting panel 21, and the anti-glare wall plate 321 is inclined relative to the light-transmitting panel 21 and surrounds the periphery of the light-transmitting panel 21. As shown in FIG. 4, when the light-transmitting panel 21 is flush with the mounting panel 31, the light-transmitting panel 21 is located below the anti-glare wall plate 321, and the inner inclined surface of the anti-glare wall plate 321 is completely blocked by the light-transmitting panel 21. After light passes through the light-transmitting panel 21, it will no longer propagate to the anti-glare wall plate 321, meeting the high-intensity lighting requirements. At this moment, the glare value of the downlight is the highest. As shown in FIGS. 5 and 6, in a parallel state, the position of the light-transmitting panel 21 relative to the anti-glare wall plate 321 changes. There is a certain spacing between the light-transmitting panel 21 and the mounting panel 31 and the former is recessed into the mounting panel 31. The entire or partial area of the anti-glare wall plate 321 is exposed from the spacing. At this moment, the light passes through the light-transmitting panel 21, propagates to the position where the anti-glare wall plate 321 is exposed, and will be reflected, avoiding excessive concentration of light in the middle of the light-transmitting panel 21, thereby reducing the light intensity, the luminous angle, and the glare value.

In Embodiment 1 of the present application, by setting connection between the light-transmitting panel 21 and the adjusting member 4, the adjusting member 4 is movably connected to the mounting housing 3, and then setting the light-transmitting panel 21 flush with or parallel to the mounting panel 31, the distance between the light-transmitting panel 21 and the mounting panel 31 can be changed by pushing the light-transmitting panel 21, so that the lighting tool becomes retractable, which is convenient for changing the position of the anti-glare wall plate 321 relative to the light-transmitting panel 21. Part or all of the anti-glare wall plate 321 can be exposed through the gap between the light-transmitting panel 21 and the mounting panel 31 to play an anti-glare role. When high-intensity lighting and a large luminous angle are required, it is only necessary to adjust the light-transmitting panel 21 to be flush with the mounting panel 31 to block the inner inclined surface of the anti-glare wall plate 321. The adjustment method is simple, which can meet the use requirements while beautifying the lighting tool.

As shown in FIGS. 4 to 6, the inner side surface of the anti-glare wall plate 321 is provided with a plurality of raised anti-glare steps 322 toward the center, and the plurality of anti-glare steps 322 are arranged progressively upward along the central axis. The anti-glare step 322 located on the top closest to the ceiling is closest to the central axis, and the anti-glare step 322 located on the bottom farthest from the ceiling is farthest from the central axis. The anti-glare step 322 located on the bottom is also closest to the light-transmitting panel 21. The inclination angle of each anti-glare step 322 can be different or the same, and the height of each anti-glare step 322 can be the same or different. To facilitate processing, the angle and height of the anti-glare step 322 in the embodiment of the present application are consistent, so there is no need to adjust the angle of the processing tool during processing. And according to the different parallel spacings between the light-transmitting panel 21 and the mounting panel 31, the number of steps exposed by the anti-glare wall plate 321 is also different, so that the glare value of the light source 1 is also different accordingly. Thus, by arranging a plurality of anti-glare steps 322 on the inner side of the anti-glare wall plate 321, the reflection area is increased, the anti-glare effect is improved, and the glare value is adjusted according to the number of anti-glare steps exposed.

FIG. 4 is a diagram of the light-transmitting panel 21 being flush with the mounting panel 31. In this state, the anti-glare steps 322 are completely blocked, and the lighting intensity and luminous angle are the maximum. FIG. 5 is a diagram when the parallel spacing between the light-transmitting panel 21 and the mounting panel 31 is the maximum. In this state, the number of anti-glare steps 322 exposed is the largest, the light is the softest, the lighting intensity is low, the luminous angle is small, and the glare value is the lowest. FIG. 6 is a diagram when the light-transmitting panel 21 is parallel to the mounting panel 31 but the spacing is not the maximum. The number of exposed anti-glare steps 322 is reduced, and the glare value is approximately in a middle state.

Figure 7:
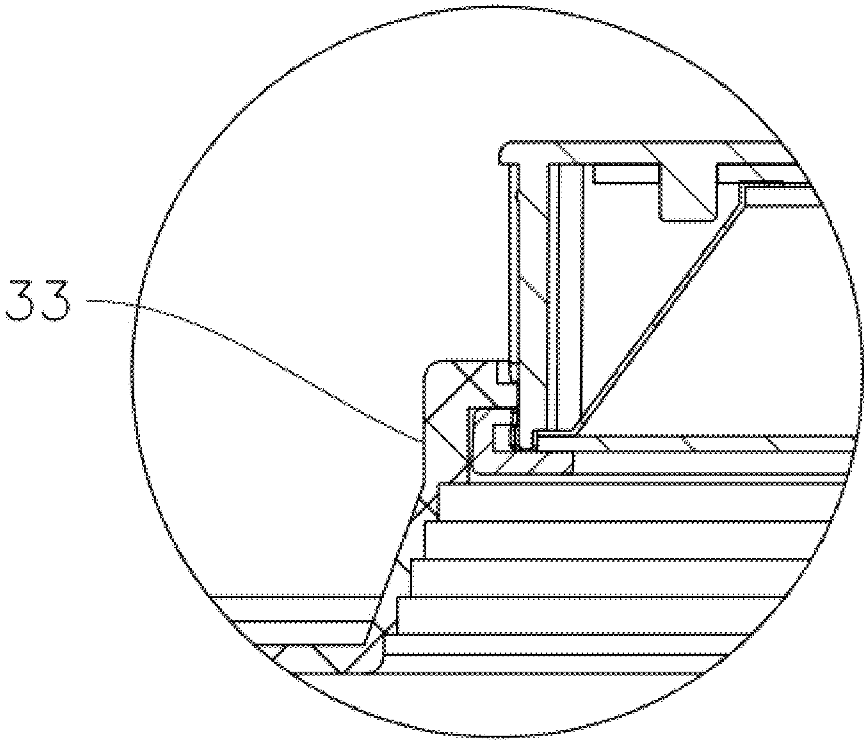
FIG. 7 is a cross-sectional diagram of the light-transmitting panel provided in some other embodiments of the present application when the parallel spacing between the light-transmitting panel and the mounting panel is the maximum.

FIG. 7 is a diagram of the maximum parallel spacing between the light-transmitting panel 21 and the mounting panel 31 provided in some other embodiments. In these embodiments, the annular top edge 33 is thicker and has a cavity inside that is large enough to accommodate the fixing ring and the light-transmitting panel. Therefore, the fixing ring and the light-transmitting panel will not block the anti-glare wall plate and the anti-glare step, so that the anti-glare portion can be fully exposed.

Figure 8:
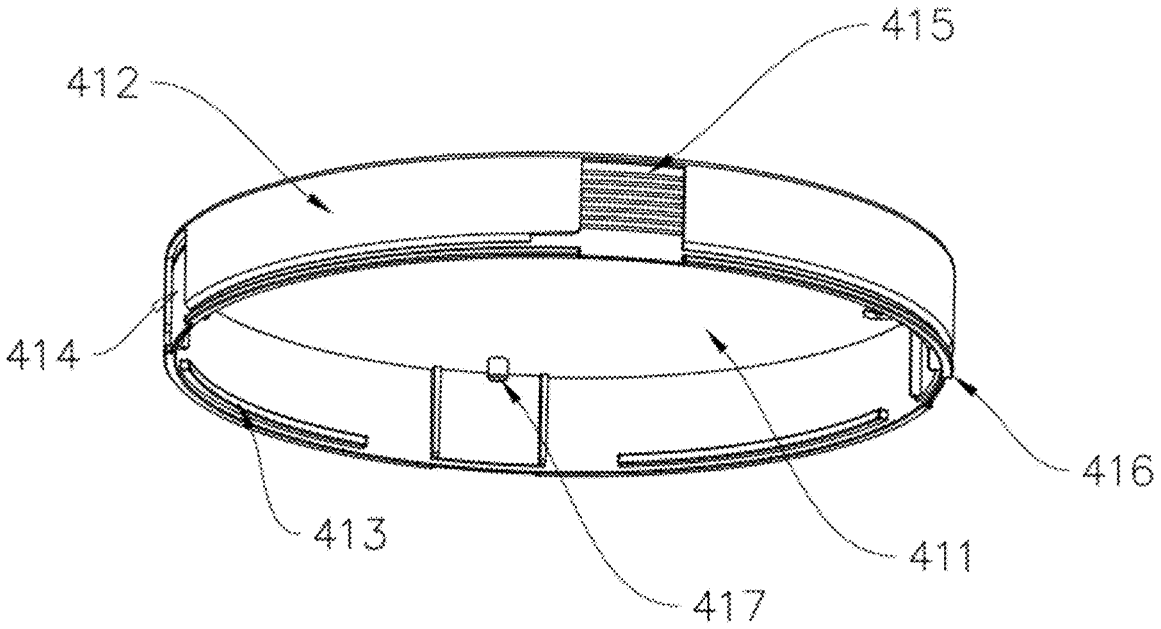
FIG. 8 is a three-dimensional diagram of an adjusting seat provided in Embodiment 1 of the present application.

FIG. 8 is a diagram of an adjusting seat provided in Embodiment 1 of the present application. As shown in FIG. 8, the adjusting seat 41 includes a circular plate-shaped top plate 411 and an annular side plate 412. The top plate 411 is parallel to the light-transmitting panel 21. Two ends of the side plate 412 are respectively connected to the top plate 411 and the light-transmitting panel 21, and are perpendicular to the top plate 411 and the light-transmitting panel 21. The side plate 412 surrounds the periphery of the light-transmitting panel 21, so that the space between the top plate 411, the side plate 412, and the light-transmitting panel 21 forms a chamber that can accommodate the light source 1. The light source 1 can be connected to the top plate 411. The annular top edge 33 extends toward the center to protrude from the anti-glare wall plate 321, and the side plate 412 is sleeved in the annular top edge 33 and can move up and down along the direction of the central axis, so that the top plate 411 is away from or close to the mounting housing 3. When moving, the adjusting seat 41 drives the light-transmitting panel 21 and the internal light source 1 to move up and down together, thereby changing the position of the light-transmitting panel 21 relative to the anti-glare wall plate 321 to adjust the glare value of the light source 1 and change the thickness of the lighting tool. An outer side of the side plate 412 is provided with a plurality of sliding grooves 414 along its circumference, and the opening of the sliding groove 414 faces the mounting housing 3. The top of the sliding groove 414 is close to the top plate 411, and the bottom of the sliding groove 414 is close to the bottom of the side plate 412. The annular top edge 33 is provided with a plurality of sliding blocks 331 along its circumference. The sliding blocks 331 protrude toward the side plate 412 and extend into the sliding groove 414. Both ends of the sliding blocks 331 contact two groove walls of the sliding groove 414. When the adjusting seat 41 moves up and down, it can be guided by the sliding groove 414 and the sliding block 331, and limited by the top of the sliding groove 414 to prevent the side plate 412 from detaching from the mounting housing 3 when moving downward.

As shown in FIG. 8, at least one stop bar 415 is provided in the sliding groove 414. The stop bar 415 is connected to the bottom of the sliding groove 414 and protrudes toward the notch. At least one stop bar 415 is close to the top plate 411, and the distance between it and the top of the sliding groove 414 can accommodate the thickness of the sliding block 331. When the side plate 412 moves to the top of the sliding groove 414 and contacts the sliding block 331 and when the lighting tool is in a retracted state, the sliding block 331 is located between the stop bar 415 and the top of the sliding groove 414. The sliding block 331 is limited up and down to keep the lighting tool in a retracted state, thereby saving packaging materials during packaging, reducing the occupied space, facilitating the placement of more lighting tools in the packaging box during batch shipment, and reducing transportation costs. When in use, after the downlight is mounted to the ceiling, if it is necessary to unfold the anti-glare portion 32, just push the light-transmitting panel 21 toward the ceiling. Under the action of external force, the stop bar 415 and the sliding block 331 are squeezed and deformed and pass over the sliding block 331, so that the adjusting seat 41 can move upward. The light-transmitting panel 21 is parallel to the mounting panel 31, exposing part of the anti-glare step 322. At this moment, the stop bar 415 moves to the top position of the sliding block 331. The adjusting seat 41 is limited by the stop bar 415, cannot move down, and remains in an unfolded state. By providing a stop bar 415 in the sliding groove 414, the lighting tool can be kept in a retracted state or an unfolded state without external force interference to suit different mounting positions.

In actual application scenarios, different mounting positions of the same lighting tool require different lighting intensities, so it is necessary to adjust different glare values for downlights at different positions. As shown in FIG. 8, there can be a plurality of stop bars 415 in each sliding groove 414, and the plurality of stop bars 415 are arranged one by one along the direction of the central axis. A limiting portion is formed between two adjacent stop bars 415, and the distance between the two stop bars 415 can correspond to the height of an anti-glare step 322 or the height of a plurality of anti-glare steps 322. During movement, the sliding block 331 will enter different limiting portions one by one. When the adjusting seat 41 moves downward, each time the sliding block 331 enters a limiting portion, one or more anti-glare steps 322 will be blocked. When the adjusting seat 41 moves upward, each time the sliding block 331 enters a limiting portion, one or more anti-glare steps 322 are exposed, thereby changing the different positions of the light-transmitting panel 21 relative to the anti-glare wall plate 321. Each time the position is changed, the sliding block 331 can be restricted by two stop bars 415 and stays still in this position, and only when there is an external force driving it will move again and change its position. By setting a plurality of stop bars 415, the light-transmitting panel 21 is stabilized at each position, and different glare effects are obtained without changing by itself. Thus, the lighting needs of different mounting positions can be met by purchasing only one downlight.

Figure 9:
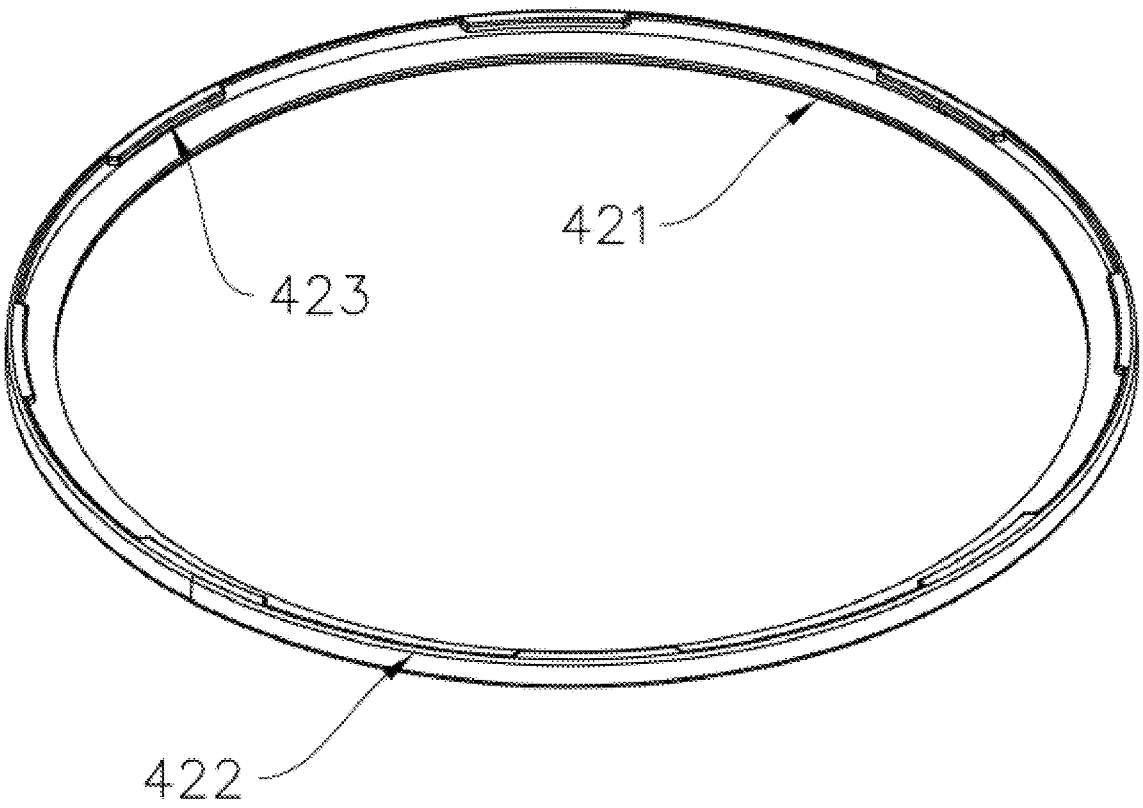
FIG. 9 is a three-dimensional diagram of a fixing ring provided in Embodiment 1 of the present application.

FIG. 9 is a diagram of a fixing ring provided in an embodiment of the present application. The fixing ring 42 is located at the bottom of the side plate 412, and includes a horizontally arranged fixing gasket 421 and a vertically arranged fixing edge 422. The fixing edge 422 is located on the outside of the side plate 412 and is provided with a first clamping portion 423 protruding toward the side plate 412. The outside of the side plate 412 is provided with a second clamping portion 416 protruding toward the fixing edge 422. The first clamping portion 423 and the second clamping portion 416 are adapted to be clamped. After the fixing ring 42 is clamped with the side plate 412, the first clamping portion 423 is located above the second clamping portion 416, so that the fixing ring 42 is hung on the side plate 412. In the embodiment of the present application, the bottom of the sliding groove 414 is also opened, so when the side plate 412 moves upward, the first clamping portion 423 can also serve as a limiting portion for the sliding block 331 to prevent the side plate 412 from detaching from the mounting housing 3. As shown in FIG. 7, the second clamping portion 416 is segmentedly arranged on the outer side surface of the side plate 412, and the first clamping portion 423 is segmentedly arranged on the inner side surface of the fixing edge 422. The arc length between two sections of the second clamping portion 416 is greater than the arc length of one section of the first clamping portion 423, so that when the fixing ring 42 and the adjusting seat 41 are mounted, the first clamping portion 423 can be clamped between the two sections of the second clamping portion 416. Then the fixing ring 42 or the adjusting seat 41 is rotated so that the first clamping portion 423 is located above the second clamping portion 416, and each section of the second clamping portion 416 is clamped between a section of the first clamping portion 423 and the fixing gasket 421 to achieve the clamping connection between the two. An arc-shaped positioning boss 413 is provided on the inner side surface of the side plate 412 and near the bottom. The positioning boss 413 protrudes toward the center direction and is arranged in sections along its circumference. The fixing gasket 421 is located below the positioning boss 413 and contacts the bottom end of the side plate 412. The fixing gasket 421 extends toward the central axis and protrudes from the positioning boss 413, thereby forming an annular positioning groove with the positioning boss 413. The circumferential side plate 412 of the light-transmitting panel 21 is inserted into the positioning groove to achieve connection with the side plate 412.

When the adjusting seat 41 moves to the top of the sliding groove 414 and contacts the sliding block 331, the light-transmitting panel 21 is flush with the mounting panel 31, and the top plate 411 is flush with the annular top edge 33. At this moment, the lighting tool is in a retracted state, and the thickness of the entire lighting tool is the minimum. The side plate 412 is opposite to the anti-glare wall plate 321. When viewed from bottom to top, the anti-glare wall plate 321 is completely blocked by the light-transmitting panel 21, and the downlight has the strongest glare value. When the adjusting seat 41 moves to the point where the first clamping portion 423 of the fixing ring 42 contacts the sliding block 331, the parallel spacing between the light-transmitting panel 21 and the mounting panel 31 is the maximum, and the parallel spacing between the top plate 411 and the annular top edge 33 is also the maximum. At this moment, the lighting tool is in an unfolded state, and the thickness of the entire lighting tool is the maximum. At this moment, the anti-glare step 322 exposed by the anti-glare wall plate 321 is at most or completely exposed. The light passes through the light-transmitting panel 21 and propagates to the anti-glare step 322, where it is reflected or refracted by the anti-glare step 322, and the glare value of the downlight is the lowest.

In some other embodiments, an external thread can be provided on the outer side surface of the side plate 412 of the adjusting seat 41, and a matching internal thread can be provided on the inner side surface of the annular top edge 33 of the mounting housing 3. The adjusting seat 41 is connected to the mounting housing 3 by threads, the position of the light-transmitting panel 21 relative to the anti-glare portion 32 is changed by thread adjustment, and the position is kept unchanged by the engagement of the internal and external threads.

In the embodiment of the present application, the lamp board 11 is connected to the inner side surface of the top plate 411, and a connector 417 connected to the lamp board 11 is provided at the bottom of the top plate 411. The power cord 12 of the lamp board 11 is led out through the top, the small diameter end of the trumpet-shaped lampshade 22 is connected to the lamp board 11, and the large diameter end of the lampshade 22 is connected to the light-transmitting panel 21. A plurality of lamp beads 111 are located in the lampshade 22. The generated light is guided and reflected to the light-transmitting panel 21 by the lampshade 22 to improve the focusing effect. In this embodiment, the periphery of the small diameter end of the lampshade 22 extends inward and is located between the lamp board 11 and the top plate 411. It is fixed together when connected to the connector 417 by means of the lamp board 11. The periphery of the large diameter end of the lampshade 22 extends outward and is inserted into the positioning groove together with the light-transmitting panel 21 to achieve a fixed connection. The mounting is simple and fast.

Figure 10:
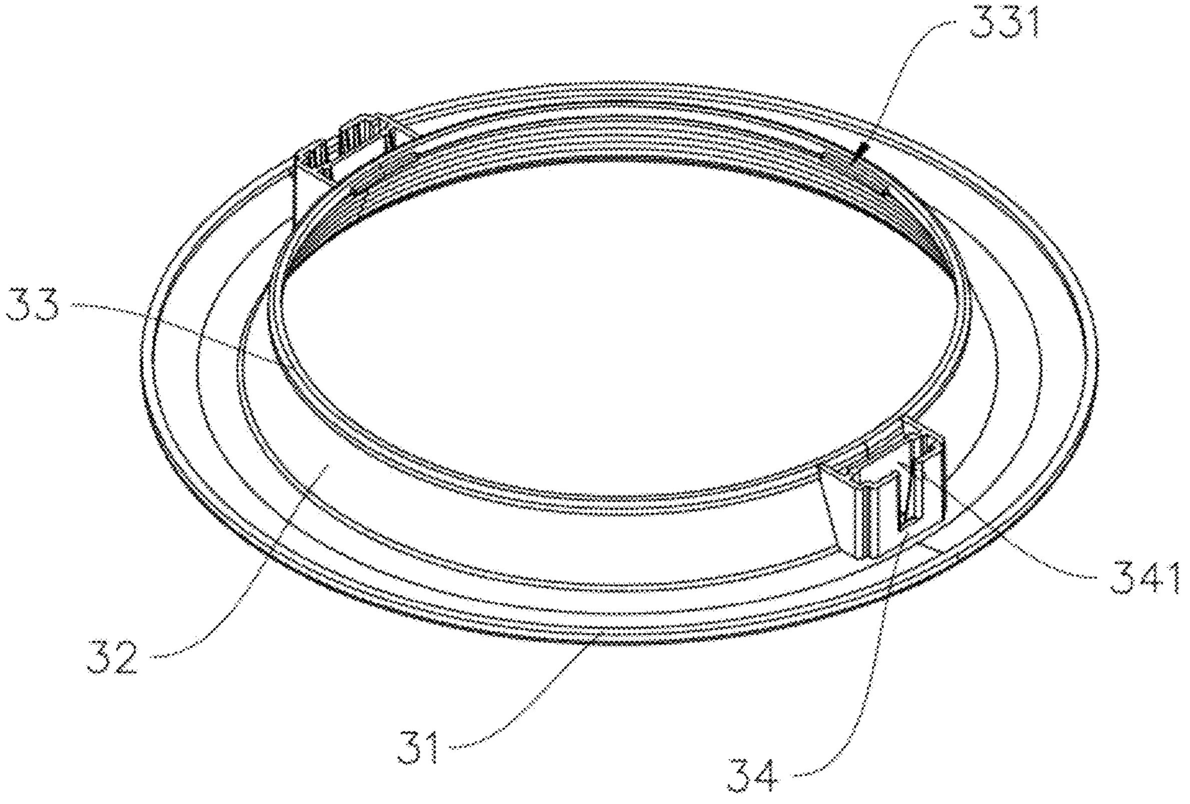
FIG. 10 is a three-dimensional diagram of a mounting housing provided in Embodiment 1 of the present application.
Figure 11:
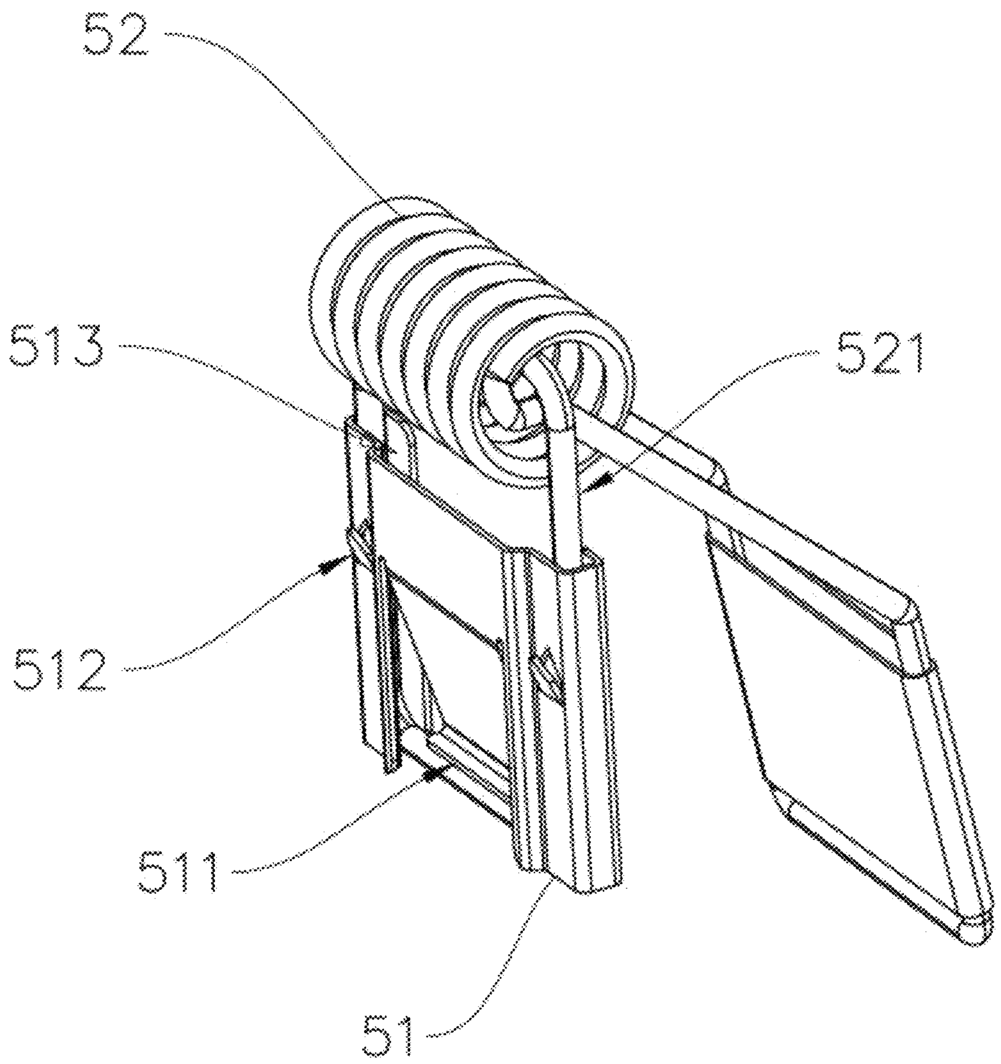
FIG. 11 is a three-dimensional diagram of an elastic buckle provided in Embodiment 1 of the present application.

FIGS. 10 and 11 are diagrams of a mounting housing provided in an embodiment of the present application. Two symmetrical plug-ins 34 are provided on the outer side surface of the mounting housing 3, the two plug-ins 34 are connected to the anti-glare wall plate 321, and a first slot 341 is provided in the plug-in for plugging with an elastic buckle 5. The elastic buckle 5 includes a bracket 51 and an elastic member 52. The bracket 51 is adapted to the first slot 341 and can be inserted into the first slot 341. The elastic member 52 includes a U-shaped connecting rod 521. The bracket 51 is provided with a second slot 513 and a buckle portion 511. When being mounted, both sides of the U-shaped connecting rod 521 of the elastic member 52 are inserted into the second slot 513. The bottom of the U-shaped connecting rod 521 is located below the buckle portion 511 and abuts against each other. Then the bracket 51 is placed in the first slot 341, and the U-shaped connecting rod 521 is buckled into the first slot 341 by means of the buckle portion 511. A pressing plate 512 is provided on one side of the bracket 51, and the pressing plate 512 is inclined outward. When the bracket 51 is plugged into the first slot 341, the pressing plate 512 squeezes the groove wall of the first slot 341 to fix the bracket 51 in the first slot 341. The embodiment of the present application facilitates processing or procurement by setting the elastic buckle 5 into a separate bracket 51 and an elastic member 52. Moreover, the elastic member 52 can be packaged separately, saving the space occupied by the entire lighting tool and improving the loading rate. The elastic member 52 is buckled into the first slot 341 by means of the bracket 51 to prevent the elastic member 52 from falling off.

Figure 12:
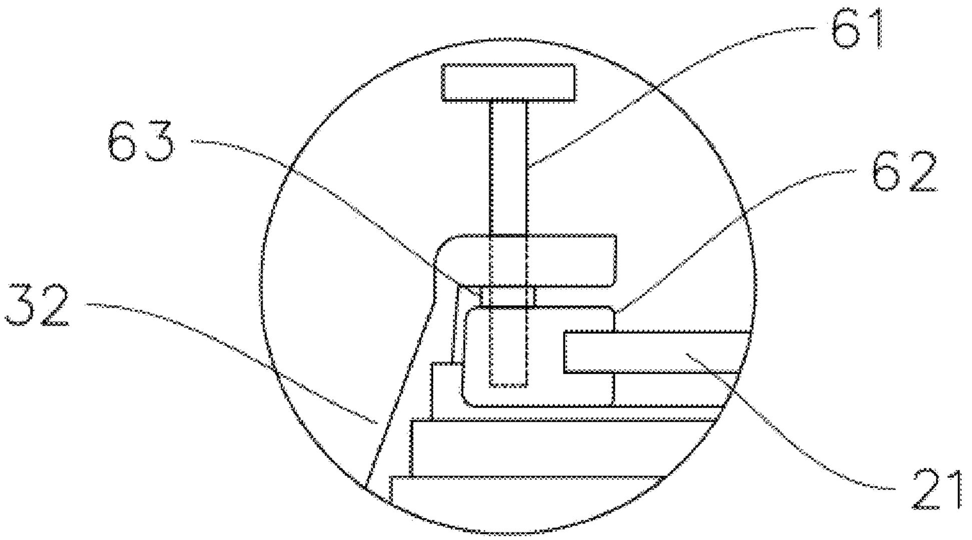
FIG. 12 is a diagram of an adjusting member provided in some other embodiments.

In some other embodiments, as shown in FIG. 12, the adjusting member 4 may include an adjusting screw 61 and a fixing seat 62, the light-transmitting panel 21 is connected to the fixing seat 62, and both the mounting housing 3 and the fixing seat 62 are provided with internal threaded holes adapted to the adjusting screw 61. The adjusting screw 61 passes through the internal threaded hole of the mounting housing 3 and is connected to the internal threaded hole of the fixing seat 62, and is locked and fixed by a nut 63. During adjustment, the position of the light-transmitting panel 21 relative to the anti-glare portion 32 is changed by rotating the adjusting nut 63 to move it up and down in the internal threaded hole of the mounting housing.

The mounting and use steps of the downlight disclosed in the embodiment of the present application are as follows: opening an adaptive mounting hole on the ceiling, connecting the power cord of the lamp board to an external power supply, inserting the downlight into the mounting hole, in which the adjusting seat faces upward, the mounting panel faces downward, and is hung with the ceiling by means of an elastic buckle. Turning on the power switch, the downlight will light up, and adjust the glare value of the downlight according to different positions. Among them, the adjustment method includes: pushing the light-transmitting panel toward the ceiling to make the light-transmitting panel concave and expose the peripheral anti-glare wall plate; if the glare value does not meet the requirements, continue to push the light-transmitting panel toward the ceiling for anti-glare to expose much more the anti-glare wall plate until it cannot be pushed or the glare value meets the requirements.

The downlight disclosed in the embodiment of the present application is designed to have a retractable lamp body, which is retracted when shipping and packaging to reduce the overall volume, save occupied space, and improve the loading rate. During mounting, retract or unfold the body according to the mounting position to meet different lighting needs and requirements for the mounting position. Taking a 6" downlight as an example, it is 17.5 mm thick when retracted and 29.5 mm when unfolded, which can be adapted to the ceiling thickness of 0.33-1.2 in. When there is a beam behind the ceiling, the lighting tool can be retracted for mounting to avoid interference with the beam. When there is no beam, the lighting tool can be unfolded to meet the corresponding lighting needs.

Embodiment 2

Figure 13:
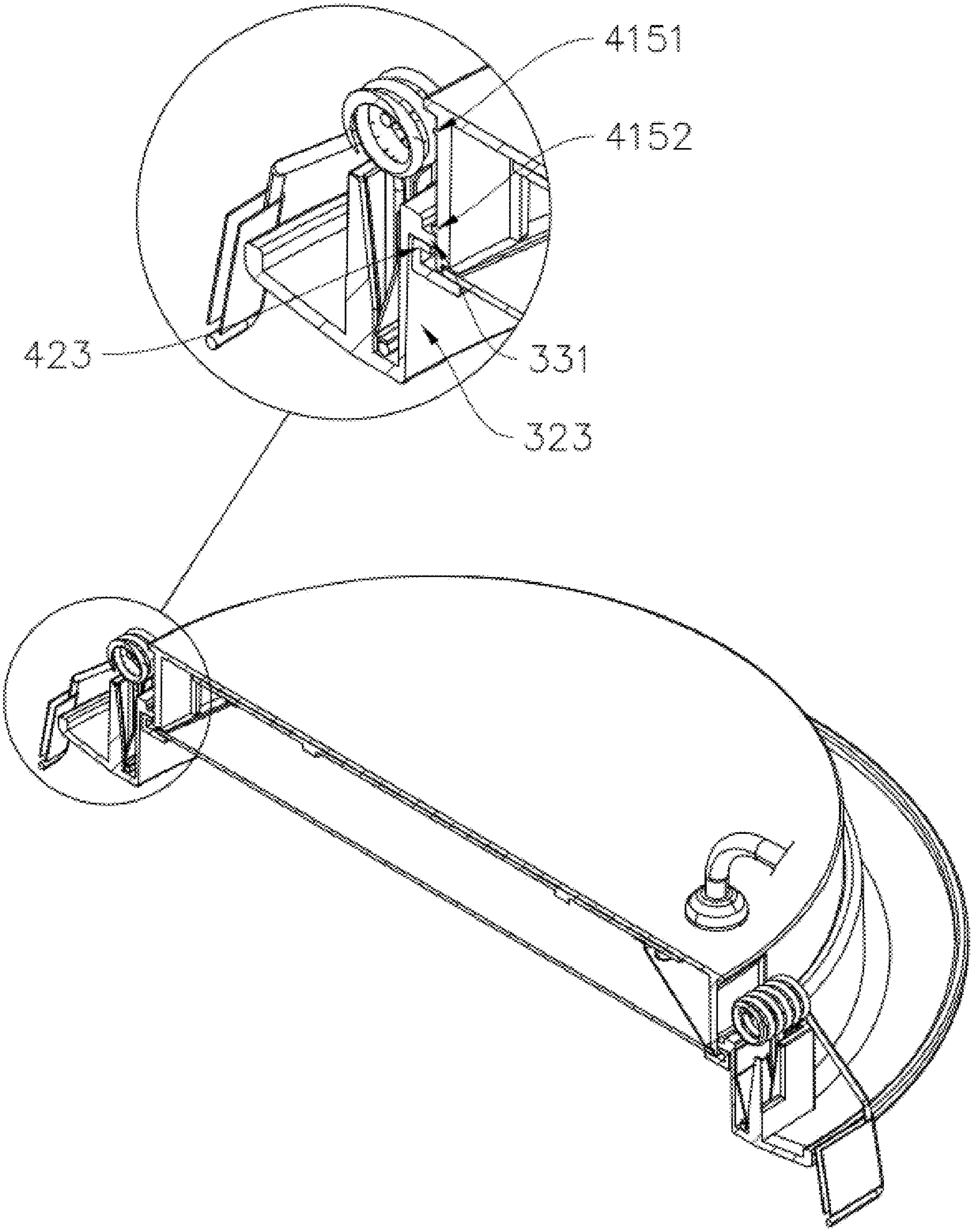
FIG. 13 is a cross-sectional three-dimensional diagram of a lighting tool provided in Embodiment 2 of the present application.

FIG. 13 is a diagram of another lighting tool provided in Embodiment 2 of the present application. The difference between Embodiment 2 and Embodiment 1 lies in the following: The anti-glare portion 32 includes an anti-glare side plate 323, the anti-glare side plate 323 is perpendicular to the light-transmitting panel 21. There are two stop bars 415. The first stop bar 4151 is close to the top of the sliding groove 414, and the second stop bar 4152 is close to the bottom of the sliding groove 414. When the adjusting seat 41 moves to a position where the light-transmitting panel 21 is flush with the mounting panel 31, the sliding block 331 is located between the first stop bar 4151 and the top of the sliding groove 414. The inner side surface of the anti-glare side plate 323 is completely blocked, and the light-transmitting panel 21 is kept flush with the mounting panel 31, so that the entire lighting tool is in a contracted state, which is convenient for packaging and shipment, and meets the requirements for luminous angle and high-intensity lighting; when the adjusting seat 41 moves to the position where the parallel spacing between the light-transmitting panel 21 and the mounting panel 31 is the maximum, the sliding block 331 is located between the second stop bar 4152 and the first clamping portion 423, the inner side surface of the anti-glare side plate 323 is fully or mostly exposed, and the light-transmitting panel 21 is kept parallel to the mounting panel 31, so that the entire lighting tool is in a fully unfolded state, meeting the soft lighting requirements and having the best anti-glare effect.

Embodiment 3

Figure 14:
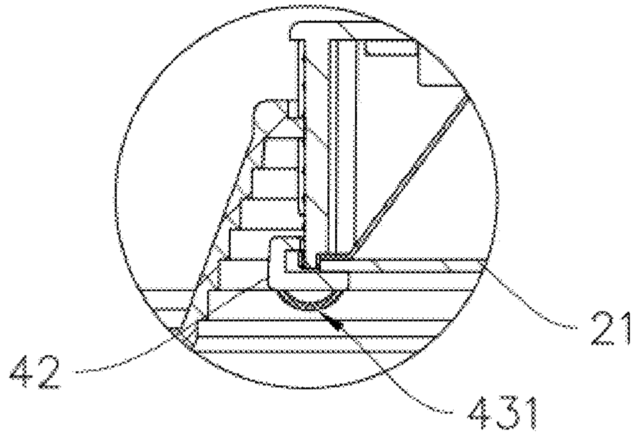
FIG. 14 is a partial cross-sectional diagram of a lighting tool provided in Embodiment 3 of the present application.
Figure 15:
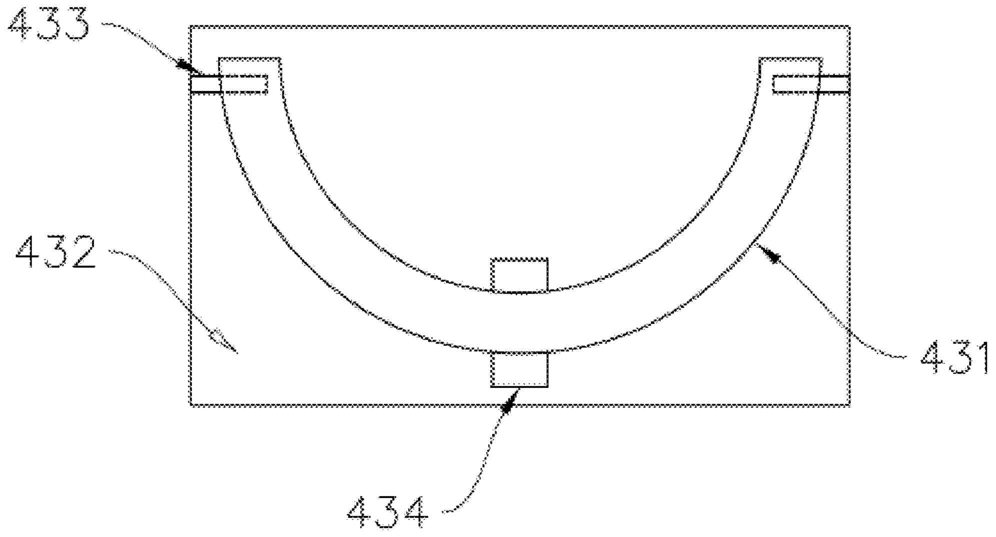
FIG. 15 is a diagram of a pull ring at the bottom of the fixing ring provided in Embodiment 3 of the present application.

FIGS. 14 and 15 are diagrams of another lighting tool provided in Embodiment 3 of the present application. The difference between Embodiment 3 and Embodiment 1 or 2 lies in the following: A pull ring 431 is provided at the bottom of the fixing ring 42.

When the lighting tool is mounted on the ceiling in an unfolded state, if a user feels that the light intensity and luminous angle are not enough and wants to adjust the lighting tool back to a retracted state or slightly enhance the lighting effect, the user needs to remove the lighting tool from the ceiling, press down the adjusting seat 41 to retract it, and then remount it. At this moment, if the user is still not satisfied with the lighting effect, he or she needs to remove it from the ceiling and adjust it again, which is very inconvenient. Therefore, in Embodiment 3 of the present application, a pull ring 431 is provided at the bottom of the fixing ring 42. When the lighting tool has been mounted on the ceiling and it is necessary to increase the brightness, the light-transmitting panel 21 can be moved down by pulling the pull ring 431 downward to block more anti-glare steps 322 or anti-glare side plates 323. When it is necessary to reduce the brightness and improve the anti-glare effect, the light-transmitting panel 21 is pushed toward the ceiling. Therefore, whether it is necessary to increase the lighting brightness or improve the anti-glare effect, there is no need to remove the lighting tools from the ceiling, and the adjustment is highly convenient. As shown in FIG. 15, a receiving groove 432 can further be provided at the bottom of the fixing ring 42 for receiving the pull ring 431. A rotating shaft 433 is provided in the receiving groove 432, and a rotating hole is provided on the pull ring 431. The rotating hole is adapted to be coaxially connected with the rotating shaft 433, and the pull ring 431 can be flipped along the rotating shaft 433. When the pull ring 431 is not needed, the pull ring 431 is flipped into the receiving groove 432 and clamped by an elastic clip 434 without protruding from the bottom of the fixing ring 42. When the pull ring 431 is needed, the pull ring 431 is flipped out of the receiving groove 432, and the pull ring 431 protrudes from the bottom of the fixing ring 42, which is convenient for pulling to adjust the position of the light-transmitting panel 21. By providing a pull ring 431, it is convenient to pull the light-transmitting panel 21 downward and adjust the glare value of the light source 1 downward. By providing a receiving groove 432 for receiving the pull ring 431, it shall be avoided that the pull ring 431 protrudes when the pull ring 431 is not in use and compromises the aesthetics of the lighting tool. A slidable groove cover can further be provided at the opening of the receiving groove 432 to cover the receiving groove 432 and beautify the lighting tool.

Embodiment 4

Figure 16:
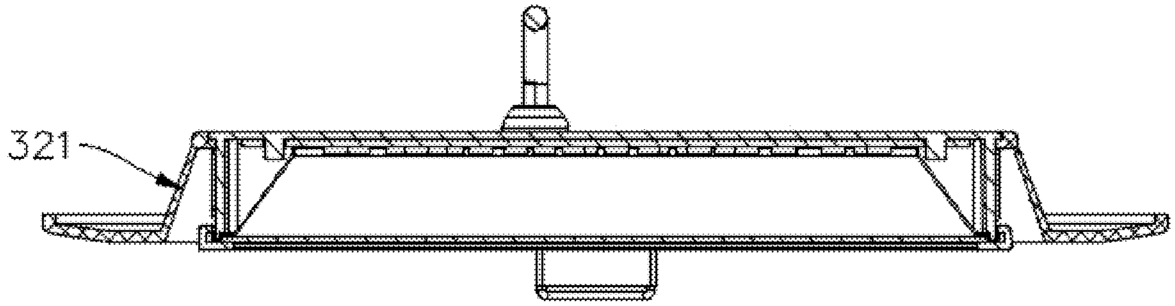
FIG. 16 is a cross-sectional diagram of a lighting tool provided in Embodiment 4 of the present application.

FIG. 16 is a diagram of a lighting tool provided in Embodiment 4 of the present application. The difference between Embodiment 4 and Embodiment 1 is that the anti-glare portion 32 only includes an anti-glare wall plate 321, and there is no step on the inner side surface of the anti-glare wall plate 321.

In other embodiments, one step may be provided on the inner side surface of the anti-glare wall plate 321.

It should be understood that although the steps in the flowchart of the accompanying drawings are displayed sequentially as indicated by the arrows, these steps are not necessarily executed in the order indicated by the arrows. Unless explicitly stated otherwise herein, there is no strict limitation on the execution sequence of these steps, and these steps can be executed in other orders.

The above are all preferred embodiments of the present application and do not limit the scope of protection of the present application. Therefore, any equivalent changes made according to the structure, shape and principle of the present application shall be covered within the scope of protection of the present application.

What is claimed is:

1. A lighting tool, comprising:

a light source, a light-transmitting member, a mounting housing, and an adjusting member;

the mounting housing comprises an anti-glare portion, and the anti-glare portion surrounds the periphery of the light-transmitting member; the adjusting member is connected to the mounting housing and the light-transmitting member, respectively, and adjusts the glare value of the light source by slidably changing the position of the light-transmitting member relative to the anti-glare portion.

2. The lighting tool according to claim 1, wherein the light-transmitting member comprises a light-transmitting panel, the anti-glare portion comprises an anti-glare wall plate or an anti-glare side plate, the anti-glare wall plate is tilted relative to the light-transmitting panel, and the anti-glare side plate is perpendicular to the light-transmitting panel; and the light-transmitting panel is configured to block all or part of the inner side surface of the anti-glare wall plate or the anti-glare side plate.

3. The lighting tool according to claim 2, wherein the anti-glare portion comprises a plurality of anti-glare steps, the plurality of anti-glare steps are connected to the inner side surface of the anti-glare wall plate and arranged step by step, the light-transmitting panel blocks some or all of the anti-glare steps, and different numbers of the anti-glare steps exposed will result in different glare values of the light source.

4. The lighting tool according to claim 2, wherein the adjusting member comprises an adjusting seat, the adjusting seat comprises a top plate and a side plate, the top plate is parallel to the light-transmitting panel, one end of the side plate is connected to the top plate, and the other end is connected to the light-transmitting panel, the side plate surrounds the periphery of the light-transmitting panel, the light source is located between the top plate and the light-transmitting panel, and the mounting housing is movably connected to the side plate so that the top plate is away from or close to the mounting housing.

5. The lighting tool according to claim 4, wherein the side plate is provided with a plurality of sliding grooves along its circumference, and the opening of the sliding groove faces the mounting housing; the mounting housing comprises a plurality of sliding blocks, and the plurality of sliding blocks correspond to the plurality of sliding grooves one by one; the sliding blocks and the sliding grooves are configured to guide and limit the mounting housing and the side plate when they move relative to each other.

6. The lighting tool according to claim 5, wherein at least one stop bar is provided in the sliding groove, the at least one stop bar is close to the top of the sliding groove and parallel to the circumference of the top plate, and the sliding block is located between the stop bar and the top of the sliding groove to maintain the position of the light-transmitting panel.

7. The lighting tool according to claim 5, wherein a plurality of stop bars are provided in the sliding groove, the plurality of stop bars are arranged at intervals along the moving direction of the side plate, a limiting portion is formed between two adjacent stop bars to limit the sliding block, and the position of the light-transmitting panel relative to the anti-glare portion is changed by making the sliding block enter different limiting portions.

8. The lighting tool according to claim 5, wherein two stop bars are provided in the sliding groove, namely a first stop bar near the top of the sliding groove and a second stop bar near the bottom of the sliding groove; the sliding block is located between the first stop bar and the top of the sliding groove, the inner side surface of the anti-glare wall plate or the anti-glare side plate is completely blocked, the sliding block is located between the second stop bar and the bottom of the sliding groove, and the inner side surface of the anti-glare wall plate or the anti-glare side plate is exposed.

9. The lighting tool according to claim 4, wherein the adjusting member comprises a fixing ring, a positioning boss is provided at one end of the side plate away from the top plate, the fixing ring and the positioning boss surround the periphery of the light-transmitting panel, the fixing ring is engaged with the side plate and is located below the positioning boss, and the periphery of the light-transmitting panel is located between the positioning boss and the fixing ring.

10. The lighting tool according to claim 1, wherein two elastic buckles are provided, the elastic buckle comprises an elastic member and a bracket, the mounting housing comprises two plug-ins, the plug-in is provided with a first slot, the bracket is adapted to be plugged into the first slot, the elastic member is buckled in the first slot by means of the bracket, and the two elastic buckles are symmetrically arranged.

11. A lighting tool, comprising:

a light source, a light-transmitting member, a mounting housing, and an adjusting member;

wherein the light source and the light-transmitting member are connected to the adjusting member, the adjusting member is connected to the mounting housing in a sleeved manner, the adjusting member slidably moves relative to the mounting housing along an axial direction of the mounting housing, and the thickness of the lighting tool is changed and maintained when the adjusting member moves relative to the mounting housing, so that the lighting tool is adapted to be mounted in different positions.

12. The lighting tool according to claim 11, wherein the adjusting member comprises an adjusting seat, the adjusting seat comprises a top plate and a side plate, one end of the side plate is connected to the top plate, and the other end is connected to the light-transmitting member, the side plate surrounds the periphery of the light-transmitting member, the light source is located between the top plate and the light-transmitting member, and the mounting housing is movably connected to the side plate so that the top plate is away from or close to the mounting housing.

13. The lighting tool according to claim 12, wherein the side plate is provided with a plurality of sliding grooves along its circumference, and the opening of the sliding groove faces the mounting housing; the mounting housing comprises a plurality of sliding blocks, and the plurality of sliding blocks correspond to the plurality of sliding grooves one by one; the sliding blocks and the sliding grooves are configured to guide and limit the mounting housing and the side plate when they move relative to each other.

14. The lighting tool according to claim 11, wherein two elastic buckles are provided, the elastic buckle comprises an elastic member and a bracket, the mounting housing comprises two plug-ins, the plug-in is provided with a first slot, the bracket is adapted to be plugged into the first slot, the elastic member is buckled in the first slot by means of the bracket, and the two elastic buckles are symmetrically arranged.

15. The lighting tool according to claim 14, wherein the mounting housing is connected to a ceiling through the elastic buckle, and a thickness of the ceiling is between 0.3 in and 1.2 in.

* * * * *